US008547365B2

(12) United States Patent
Lee

(10) Patent No.: US 8,547,365 B2
(45) Date of Patent: Oct. 1, 2013

(54) DISPLAY APPARATUS AND METHOD FOR OUTPUTTING PARALLEL DATA SIGNALS AT DIFFERENT APPLICATION STARTING TIME POINTS

(75) Inventor: Yong Jae Lee, Yongin-si (KR)

(73) Assignee: Anapass Inc., Seoul (KR)

( * ) Notice: Subject to any disclaimer, the term of this patent is extended or adjusted under 35 U.S.C. 154(b) by 470 days.

(21) Appl. No.: 12/654,341

(22) Filed: Dec. 17, 2009

(65) Prior Publication Data

US 2010/0156870 A1 Jun. 24, 2010

(30) Foreign Application Priority Data

Dec. 18, 2008 (KR) ........................ 10-2008-0129460

(51) Int. Cl.
*G06F 3/038* (2013.01)
*G09G 5/00* (2006.01)

(52) U.S. Cl.
USPC .......................................................... 345/204

(58) Field of Classification Search
USPC .......................................................... 345/204
See application file for complete search history.

(56) References Cited

U.S. PATENT DOCUMENTS

2006/0164361 A1* 7/2006 Yi .................................. 345/96
2006/0193002 A1* 8/2006 Satou et al. .................. 358/1.15
2007/0085798 A1* 4/2007 Hashimoto et al. ............. 345/93
2007/0216630 A1* 9/2007 Liao .............................. 345/100
2007/0242019 A1* 10/2007 Jung et al. ....................... 345/98
2008/0246752 A1 10/2008 Lee
2009/0009494 A1* 1/2009 Lee ................................ 345/204
2009/0051675 A1* 2/2009 Huang ........................... 345/204
2009/0058788 A1* 3/2009 Ha et al. .......................... 345/99

FOREIGN PATENT DOCUMENTS

KR 2000-0064996 11/2000
KR 2005-0088619 9/2005

* cited by examiner

*Primary Examiner* — Kwang-Su Yang
(74) *Attorney, Agent, or Firm* — Oliff & Berridge, PLC

(57) ABSTRACT

Provided are a display device and method. The display device includes a plurality of data driving integrated circuits (ICs) configured to receive reception signals, each of which includes data and load signal information indicating an application starting time point of the data, and apply parallel data signals corresponding to the data at the application starting time points according to the load signal information included in the reception signals, and a display panel configured to display an image according to the parallel data signals, wherein at least two of the data driving ICs apply parallel data signals at different application starting time points.

10 Claims, 10 Drawing Sheets

DISPLAY APPARATUS AND METHOD FOR OUTPUTTING PARALLEL DATA SIGNALS AT DIFFERENT APPLICATION STARTING TIME POINTS

TECHNICAL FIELD

The described technology relates generally to a display device and method, and more particularly, to a display device and method employing a plurality of data driving integrated circuits (ICs).

BACKGROUND

In general, a timing controller generates a clock signal, a control signal and a data signal for driving a data driving circuit using video data and a synchronization signal input from an external video card, and supplies the generated signals to the data driving circuit.

The data driving circuit operates according to the clock signal and the control signal transferred from the timing controller, and applies an analog data signal corresponding to the data signal to a display panel. The timing controller and the data driving circuit are connected through a clock line, a control line and a data line that can transfer the clock signal, the control signal and the data signal, respectively.

SUMMARY

Embodiments provide a display device and method in which at least two data driving integrated circuits (ICs) apply data signals to a display panel at different points in time to prevent a voltage level from being changed by a large current instantaneously flowing through a data line while the data signals are transferred.

In one embodiment, a display device is provided. The display device includes a plurality of data driving integrated circuits (ICs) configured to receive reception signals, each of which includes data and load signal information indicating an application starting time point of the data, and apply parallel data signals corresponding to the data at the application starting time points according to the load signal information included in the reception signals; and a display panel configured to display an image according to the parallel data signals, wherein at least two of the data driving ICs apply parallel data signals at different application starting time points.

In another embodiment, a display device is provided. The display device includes a timing controller configured to generate data and a plurality of load signals; a plurality of data driving integrated circuits (ICs) configured to receive the data and the load signals, and apply parallel data signals corresponding to the data at application starting time points according to the load signals; and a display panel configured to display an image according to the parallel data signals, wherein at least two of the data driving ICs apply parallel data signals at different application starting time points.

In still another embodiment, a display device is provided. The display device includes a timing controller configured to generate data; a plurality of data driving integrated circuits (ICs) configured to receive the data, store load signal information indicating an application starting time points of the data, and generate parallel data signals corresponding to the data at application starting time points according to the load signal information; and a display panel configured to display an image according to the parallel data signals, wherein at least two of the data driving ICs apply parallel data signals at different application starting time points.

The Summary is provided to introduce a selection of concepts in a simplified form that are further described below in the Detailed Description. The Summary is not intended to identify key features or essential features of the claimed subject matter, nor is it intended to be used as an aid in determining the scope of the claimed subject matter.

BRIEF DESCRIPTION OF THE DRAWINGS

The above and other features and advantages of the present disclosure will become more apparent to those of ordinary skill in the art by describing in detail example embodiments thereof with reference to the attached drawings in which.

DETAILED DESCRIPTION

It will be readily understood that the components of the present disclosure, as generally described and illustrated in the Figures herein, could be arranged and designed in a wide variety of different configurations. Thus, the following more detailed description of the embodiments of device and methods in accordance with the present disclosure, as represented in the Figures, is not intended to limit the scope of the disclosure, as claimed, but is merely representative of certain examples of embodiments in accordance with the disclosure. The presently described embodiments will be best understood by reference to the drawings, wherein like parts are designated by like numerals throughout. Moreover, the drawings are not necessarily to scale, and the size and relative sizes of layers and regions may have been exaggerated for clarity.

Figure 1:
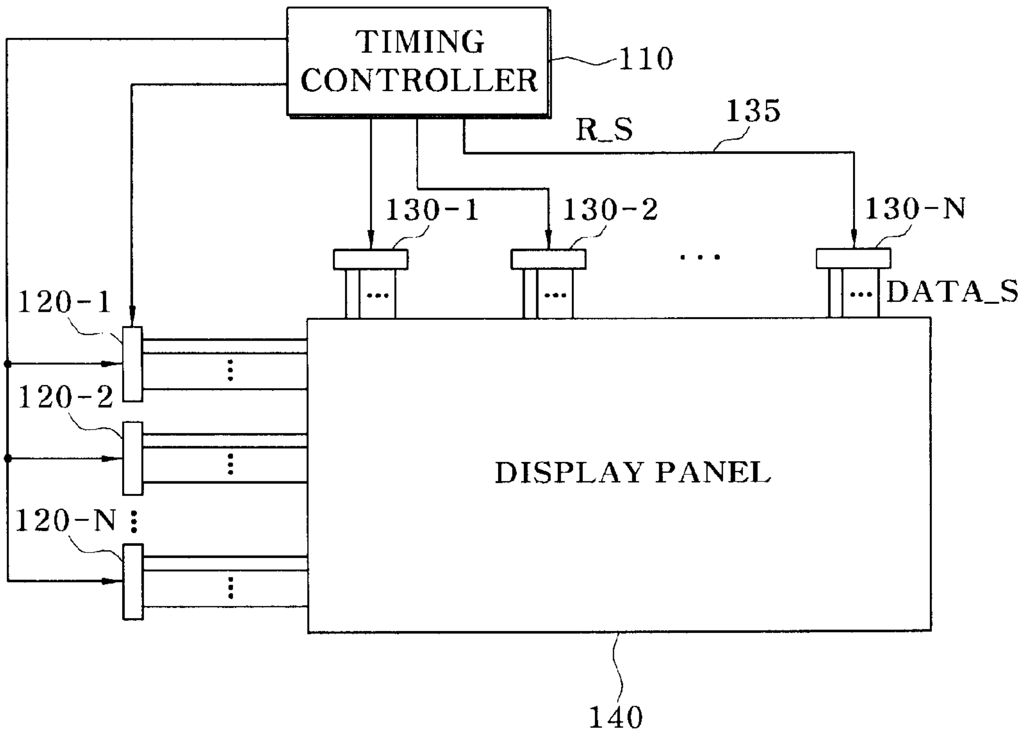
FIG. 1 is a block diagram of a display device according to an embodiment of the present disclosure.
Figure 2:
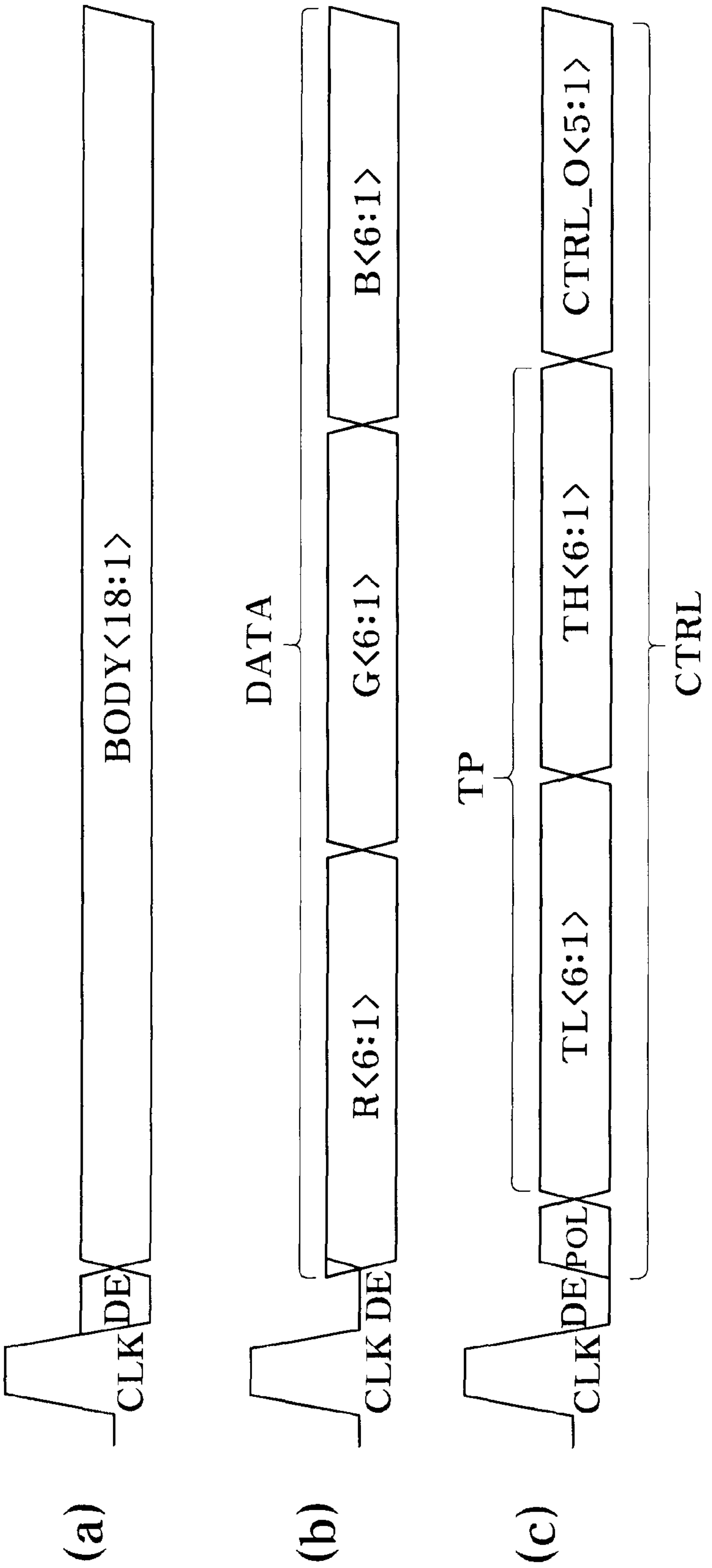
FIG. 2 illustrates examples of a transmission signal generated by a timing controller shown in FIG. 1.
Figure 3:
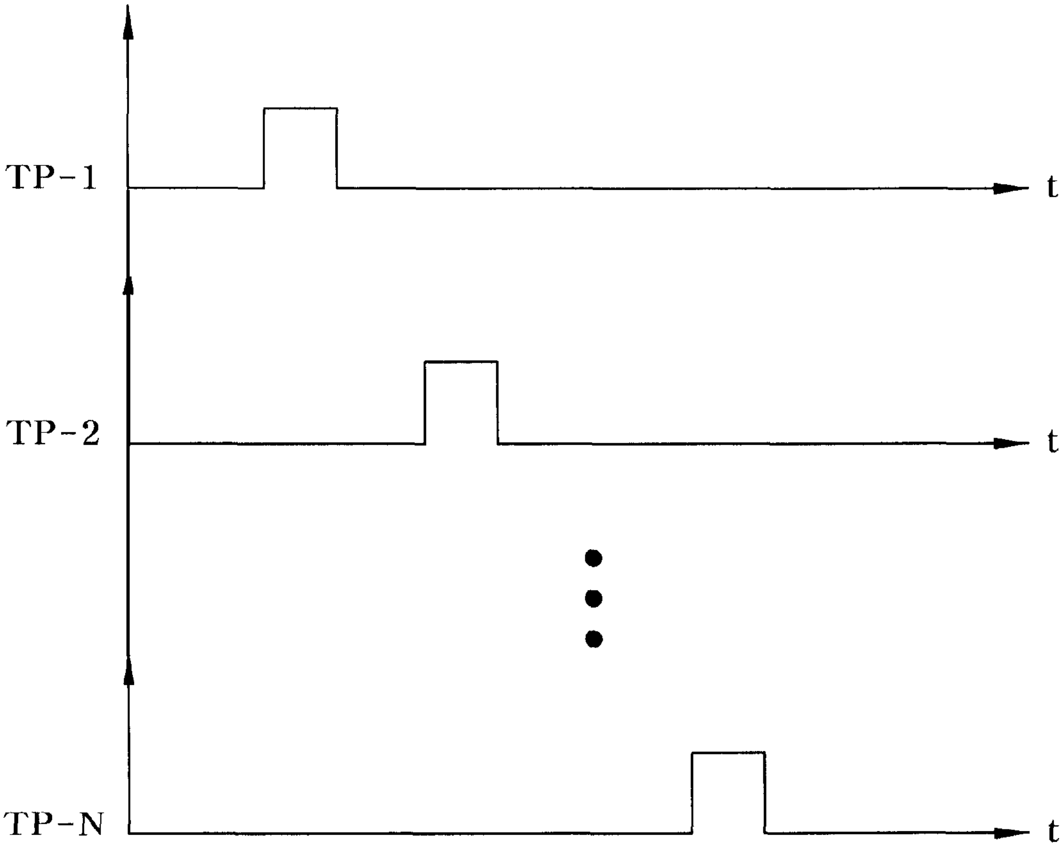
FIG. 3 illustrates examples of load signals generated by a plurality of data driving integrated circuits (ICs)

FIG. 1 is a block diagram of a display device according to an embodiment of the present disclosure, FIG. 2 illustrates examples of a transmission signal generated by a timing controller 110 shown in FIG. 1, and FIG. 3 illustrates examples of load signals generated by a plurality of data driving integrated circuits (ICs) 130-1, 130-2, . . . , 130-N. Referring to FIG. 1, the display device includes the timing controller 110, gate driving ICs 120-1, 120-2, . . . , 120-N, the data driving ICs 130-1, 130-2, . . . , 130-N, and a display panel 140.

The timing controller 110 generates transmission signals using video data and a synchronization signal input from an external video card, and applies the generated transmission signals to the data driving ICs 130-1 to 130-N through transmission signal lines 135, respectively. Here, at least two of the transmission signals generated by the timing controller 110 include load signal information indicating the application starting time points of different parallel data signals.

To be specific, each of the transmission signals includes clock information, mode information, and a body. The body is the transmission signal excluding the clock information and the mode information, and may be control information or data.

The mode information indicates whether the body is control information or data. For example, a transmission signal includes clock information CLK embedded with a different signal magnitude than mode information DE and a body BODY as shown in FIG. 2(A). Such a transmission signal includes mode information DE having a value “1” and data DATA having 6-bit red (R) data R<6:1>, 6-bit green (G) data G<6:1> and 6-bit blue (B) data B<6:1> as shown in FIG. 2(B), or includes mode information DE having a value “0” and control information CTRL including 1-bit polarity signal information POL, 12-bit load signal information TP (TL<6:1> and TH<6:1>) and 5-bit other control signal information CTRL_O<5:1> as shown in FIG. 2(C). Here, at least two of the transmission signals generated by the timing controller 110 may have different pieces of polarity signal information POL. In this case, at least two data driving ICs generate data signals in which gamma voltages having different polarities are reflected. In FIG. 2(C), first load signal information that is the 6-bit load signal information TL<6:1> disposed in the forepart of the load signal information TP indicates a point in time where a load signal rises, that is, the application starting time point of a parallel data signal, and second load signal information that is the 6-bit load signal information TH<6:1> disposed in the back part of the load signal information TP indicates the pulse width of the rising load signal. At least two of the transmission signals generated by the timing controller 110 have different pieces of first load signal information TL<6:1>. At least two of the transmission signals generated by the timing controller 110 may have different pieces of second load signal information TH<6:1>. The timing controller 110 generates and applies gate control signals to the gate driving ICs 120-1 to 120-N.

The gate driving ICs 120-1 to 120-N supply scan signals to respective gate lines of the display panel 140 in sequence according to the gate control signal applied from the timing controller 110. Thus, the gate lines of the display panel 140 are activated in sequence, and thin film transistors (TFTs) connected with the respective gate lines are turned on, so that signals can pass through the TFTs. Data signals supplied from the respective data driving ICs 130-1 to 130-N can be supplied to pixel electrodes via TFTs connected with activated gate lines.

The data driving ICs 130-1 to 130-N receive transmission signals (referred to as reception signals R_S) applied from the timing controller 110 through the transmission signal lines 135, and apply a plurality of parallel data signals DATA_S corresponding to pieces of data DATA included in the reception signals R_S to the display panel 140. At this time, reception signals R_S received by at least two data driving ICs 130-1 and 130-2 among the data driving ICs 130-1 to 130-N include load signal information TP indicating different application starting time points. Thus, the at least two data driving ICs 130-1 and 130-2 generate load signals rising at different points in time, and supply parallel data signals DATA_S to respective data lines of the display panel 140. For example, the data driving ICs 130-1 to 130-N may generate load signals TP-1, TP-2, . . . , TP-N rising at different points in time as shown in FIG. 3.

To be specific, each of the data driving ICs 130-1 to 130-N samples mode information DE and a body BODY using clock information CLK included in a reception signal R_S, and determines whether the reception signal R_S includes data DATA as shown in FIG. 2(B) or control information CTRL as shown in FIG. 2(C) with reference to the mode information DE. When the reception signal R_S includes control information CTRL, each of the data driving ICs 130-1 to 130-N generates a control signal corresponding to the control information CTRL. At this time, each of the data driving ICs 130-1 to 130-N generates a load signal corresponding to load signal information TP. Since the pieces of first load signal information TL<6:1> of the at least two data driving ICs 130-1 and 130-2 are different from each other, the at least two data driving ICs 130-1 and 130-2 generate load signals rising at different points in time. When the pieces of second load signal information TH<6:1> of at least two of the data driving ICs 130-1 to 130-N are different from each other, the at least two data driving ICs generate load signals having different pulse widths. Here, a pulse width denotes an interval between a rising time point and falling time point of a load signal. The data driving ICs 130-1 to 130-N supply parallel data signals corresponding to data DATA to the data lines of the display panel 140 according to the generated load signals, respectively.

The display panel 140 receives the scan signals through the gate lines and the parallel data signals through the data lines from the data driving circuits 130-1 to 130-N, and displays an image according to the signals. For example, the display panel 140 is a liquid crystal display (LCD) panel, plasma display panel (PDP), or organic light-emitting diode (OLED) panel.

Figure 4:
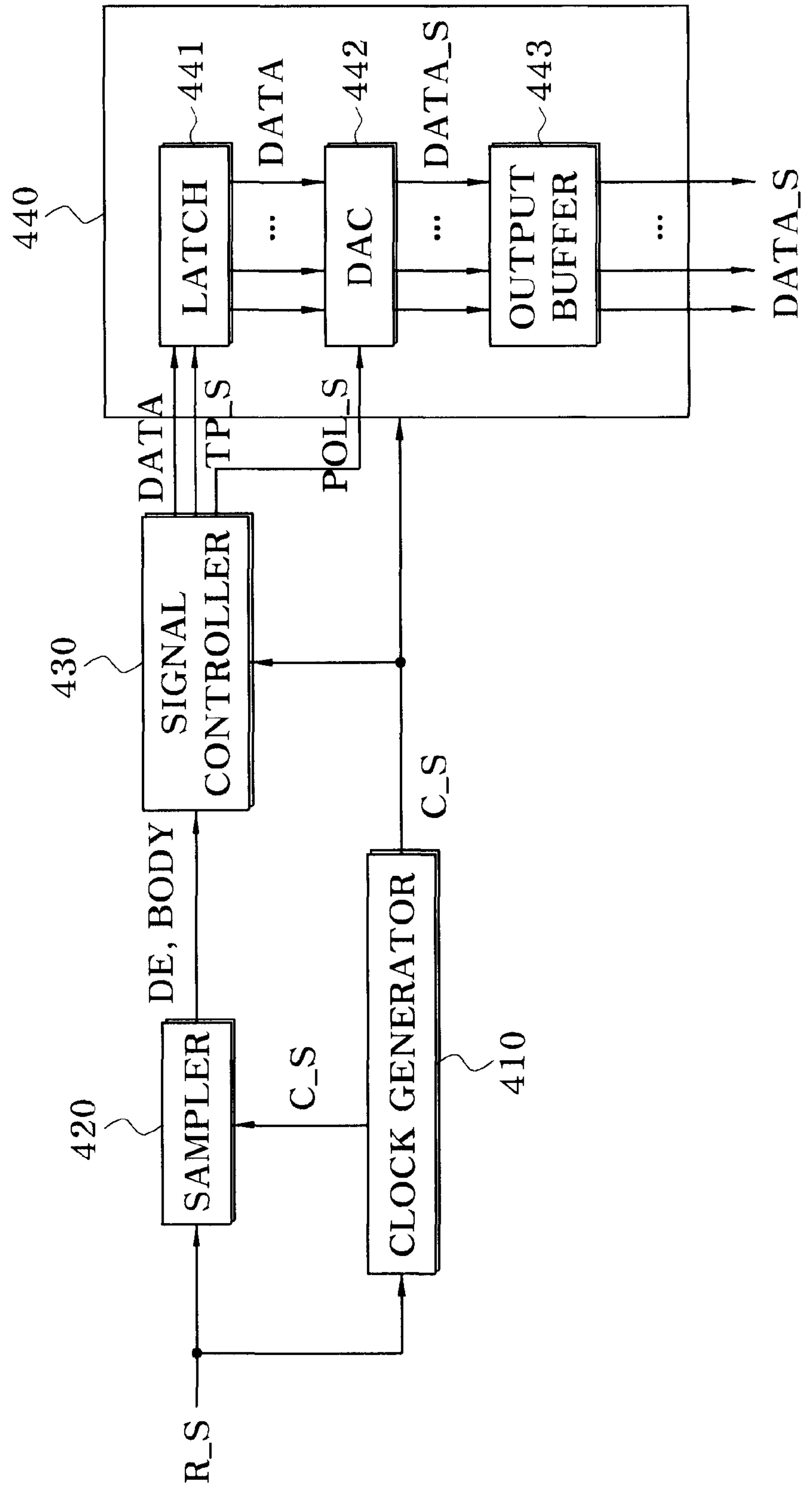
FIG. 4 is a block diagram of an example of a data driving IC shown in FIG. 1.

FIG. 4 is a block diagram of an example of the data driving IC 130-1 shown in FIG. 1. Referring to FIG. 4, the data driving IC 130-1 includes a clock generator 410, a sampler 420, a signal controller 430 and a data driver 440, and the data driver 440 includes a latch 441, a digital-to-analog converter (DAC) 442 and an output buffer 443. The other data driving ICs 130-2, . . . , 130-N also operate in the same way as the data driving IC 130-1.

The clock generator 410 generates a clock signal C_S using a reception signal R_S. The reception signal R_S includes clock information CLK, mode information DE, and a body BODY. As an example, when the clock information CLK is embedded with a different signal magnitude than the mode information DE and the body BODY as shown in FIG. 2(A), the clock generator 410 extracts the clock information CLK from the reception signal R_S using the magnitude of the reception signal R_S and generates the clock signal C_S. As another example, when the reception signal R_S has a periodic transition, the clock generator 410 may generate the clock signal C_S from the periodic transition of the reception signal R_S. The clock generator 410 may generate the clock signal C_S from the clock information CLK using a phase locked loop (PLL), delay locked loop (DLL). The clock signal C_S may have a frequency that is the same as or higher than the frequency of the clock information CLK.

The sampler 420 samples the mode information DE and the body BODY according to the clock signal C_S. The mode information DE indicates whether the body BODY is control information CTRL or data DATA. The control information CTRL corresponds to a control signal that controls the data driver 440, and the data DATA corresponds R, G and B data values constituting an image. Since all of the mode information DE, the control information CTRL, and the data DATA is synchronized with the clock signal C_S, the sampler 420 can accurately sample the mode information DE, the control information CTRL, and the data DATA according to the clock signal C_S.

The signal controller 430 applies the data DATA sampled by the sampler 420 to the data driver 440. The signal controller 430 generates a control signal corresponding to the control information CTRL sampled by the sampler 420, and applies the control signal to the data driver 440. For example, the signal controller 430 generates the control signal that controls the data driver 440 on the basis of the sampled control information CTRL, and applies the generated control signal to the latch 441, the DAC 442, etc., included in the data driver 440. For example, the control information CTRL may include load signal information TP on a load signal TP_S and polarity signal information POL on a polarity control signal POL_S. In this case, the signal controller 430 generates and applies the load signal TP_S corresponding to the load signal information TP to the latch 441, and generates and applies the polarity control signal POL_S corresponding to the polarity signal information POL to the DAC 442.

The data driver 440 operates according to the control signal applied from the signal controller 430, and applies a parallel data signal DATA_S corresponding to the data DATA to the display panel 140. The latch 441 latches the data DATA in sequence, and then outputs the data DATA to the DAC 442 in parallel according to the load signal TP_S applied from the signal controller 430. The DAC 442 converts the parallel data DATA into the parallel data signal DATA_S corresponding to a gamma voltage, and transfers the parallel data signal DATA_S to the output buffer 443. In particular, the DAC 442 generates the parallel data signal DATA_S corresponding to the parallel data DATA with reference to one of a positive (+) gamma voltage and a negative (−) gamma voltage according to the polarity control signal POL_S applied from the signal controller 430. In this way, a data signal obtained by reflecting the positive (+) gamma voltage in a common voltage and a data signal obtained by reflecting the negative (−) gamma voltage in the common voltage are alternately supplied to the display panel 140, and thus an inversion operation is enabled. The output buffer 443 provides the parallel data signal DATA_S transferred from the DAC 442 to the corresponding data line of the display panel 140.

Figure 5:
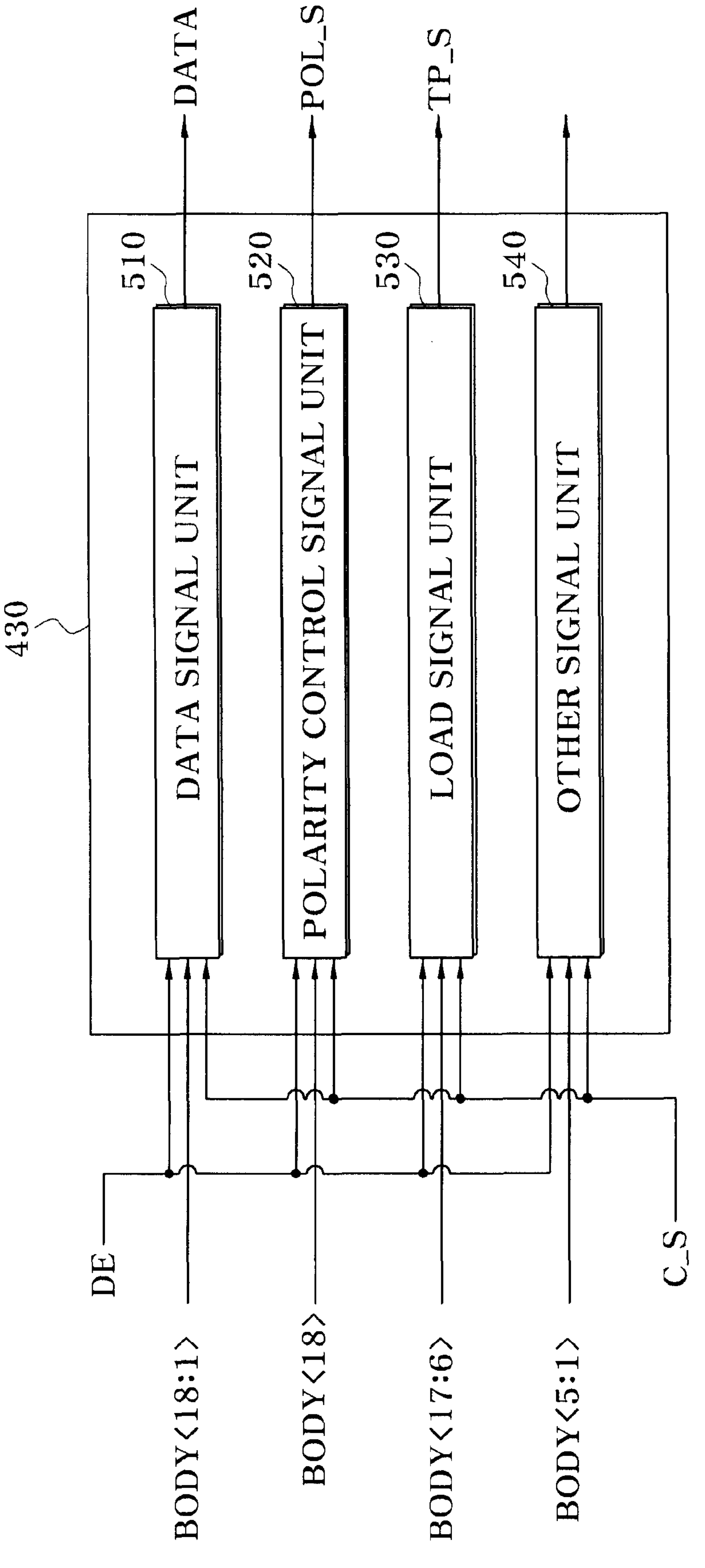
FIG. 5 is a block diagram of an example of a signal controller shown in FIG. 4.

FIG. 5 is a block diagram of an example of the signal controller 430 shown in FIG. 4. Referring to FIG. 5, the signal controller 430 includes a data unit 510, a polarity control signal unit 520, a load signal unit 530, and an other signal unit 540. The signal controller 430 receives a signal including mode information DE and a body BODY<18:1> of the reception signal R_S shown in FIG. 2(A) except the clock information CLK.

The data unit 510 operates when the mode information DE is "1," and provides the 18-bit body BODY<18:1> to the latch 441 as data DATA.

The polarity control signal unit 520 operates when the mode information DE is "0." The polarity control signal unit 520 generates and applies a low polarity control signal POL_S to the DAC 442 when a 1-bit body BODY<18> is "0," and generates and applies a high polarity control signal POL_S to the DAC 442 when the 1-bit body BODY<18> is "1."

The load signal unit 530 operates when the mode information DE is "0," and generates and applies a load signal TP_S corresponding to a 12-bit body BODY<17:6> to the latch 441.

The other signal unit 540 operates when the mode information DE is "0," and generates and applies control signals corresponding to other control signal information to the data driver 440.

Figure 6:
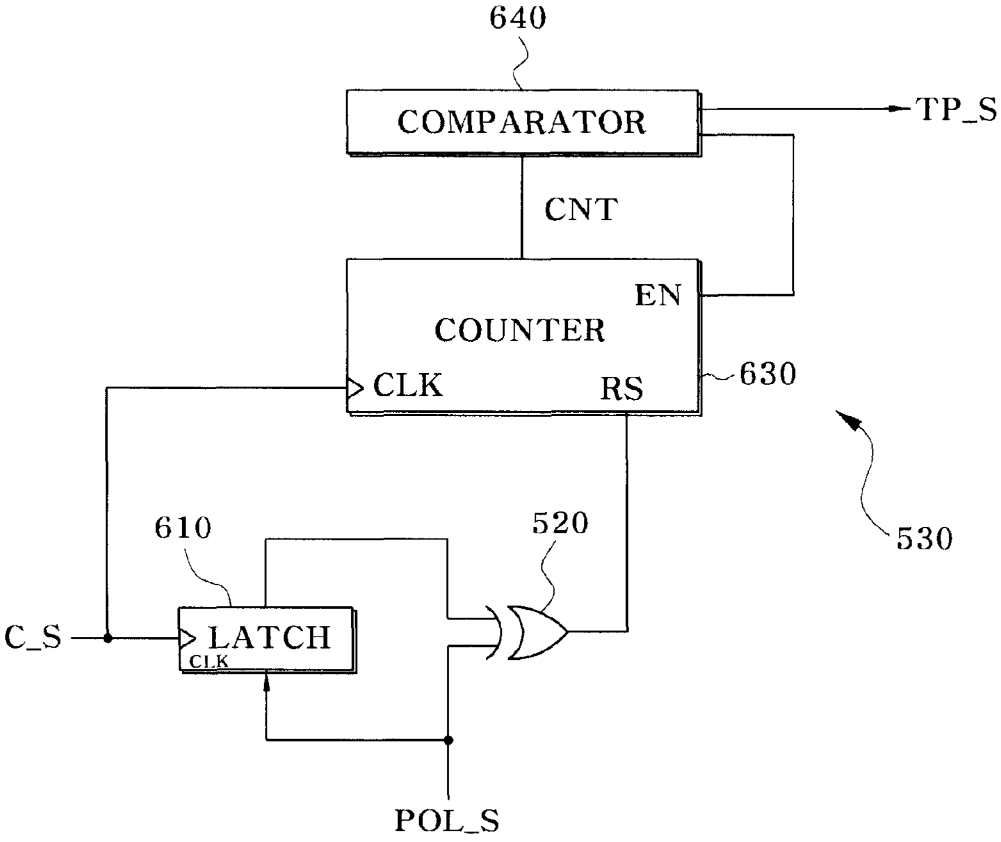
FIG. 6 is a block diagram of an example of a load signal unit shown in FIG. 5.

FIG. 6 is a block diagram of an example of the load signal unit 530 shown in FIG. 5 when a polarity control signal POL_S corresponding to a line varies. Referring to FIG. 6, the load signal unit 630 includes a latch 610, an XOR gate 620, a counter 630, and a comparator 640. The load signal unit 530 generates a load signal TP_S rising once in one line, and may be modified in various ways by those of ordinary skill in the art.

The latch 610 receives and delays a polarity control signal POL_S for one clock and then outputs the delayed polarity control signal. The XOR gate 620 receives the polarity control signal POL_S and the polarity control signal obtained by delaying the polarity control signal POL_S for one clock. The XOR gate 620 outputs a reset signal "1" in a section in which the polarity control signal POL_S rises from low to high or falls from high to low, and outputs a reset signal "0" in other sections. The counter 630 receives the clock signal C_S from the clock generator 410, the reset signal from the XOR gate 620 through a reset terminal RS, and an enable signal from the comparator 640 through an enable terminal EN. The counter 630 performs a reset operation when "1" is input to the reset terminal RS. The counter 630 performs a counting operation when an enable signal "1" is input to the enable terminal EN, and outputs a count number CNT to the comparator 640. The comparator 640 compares the count number CNT input from the counter 630 with a 12-bit body BODY<17:6>, and generates the high or low load signal TP_S according to the comparison result. For example, the comparator 640 generates the high load signal TP_S in a case where the count number CNT is equal to or larger than TL<6:1> and smaller than a value obtained by adding TH<6:1> to TL<6:1>, and generates the low load signal TP_S in other cases. In this way, the comparator 640 activates the load signal TP_S when a clock indicated by TL<6:1> elapses after the polarity control signal POL_S varies, and deactivates the load signal TP_S when a clock indicated by TH<6:1> elapses after the load signal TP_S is activated.

The comparator 640 outputs an enable signal "0" to the enable terminal EN of the counter 630 in a case where the count number CNT is equal to or larger than the value obtained by adding TH<6:1> to TL<6:1>, and outputs an enable signal "1" to the enable terminal EN of the counter 630 in other cases.

Figure 7:
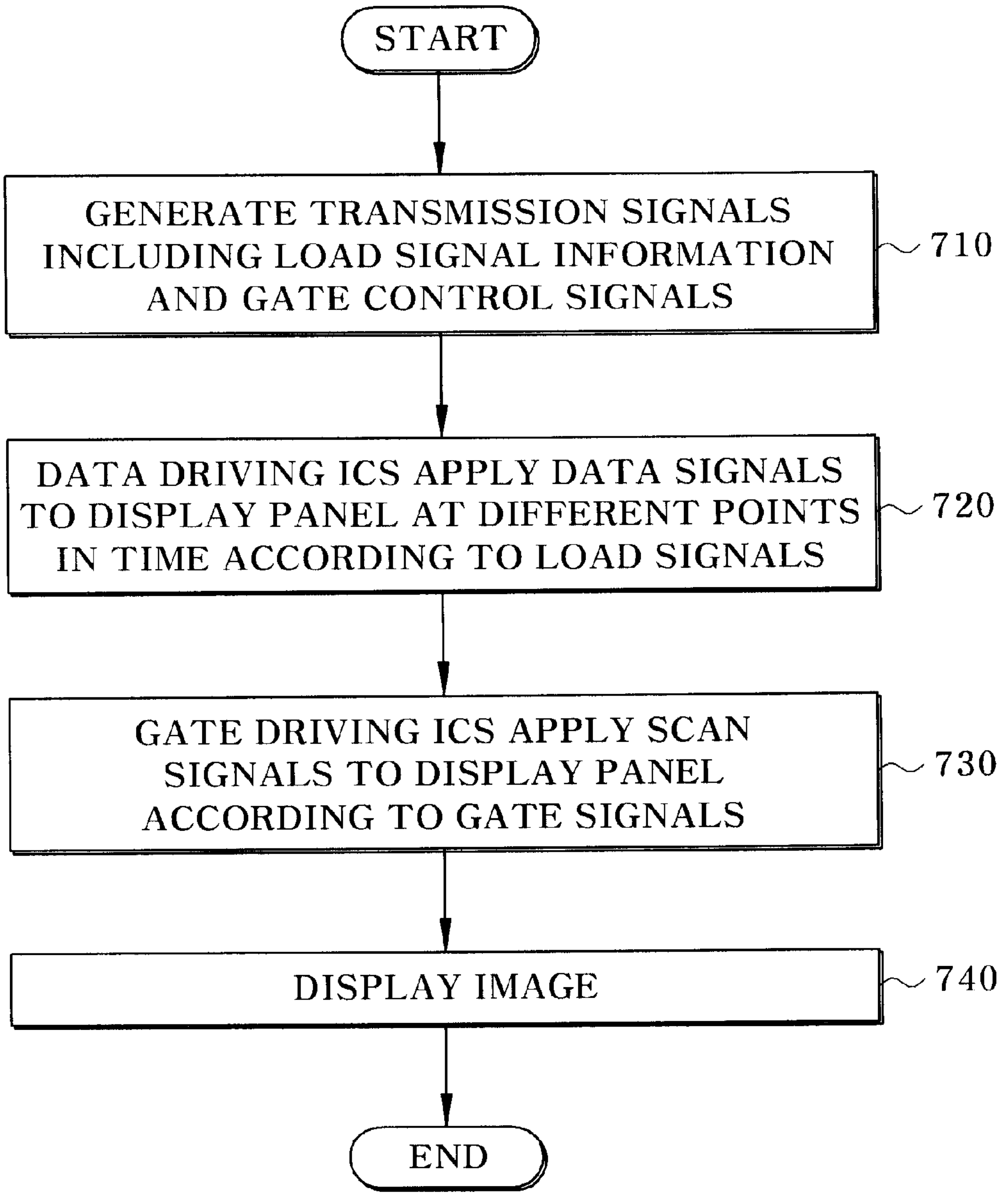
FIG. 7 is a flowchart illustrating a display method according to an embodiment of the present disclosure.

FIG. 7 is a flowchart illustrating a display method according to an embodiment of the present disclosure. Referring to FIG. 7, the display method according to this embodiment includes operations processed by the display device shown in FIG. 1 according to the time flow. Thus, the above description regarding the display device shown in FIG. 1 is also applied to the display method according to this embodiment even if the description is not reiterated below.

Referring to FIG. 7, a timing controller generates transmission signals using video data and a synchronization signal input from an external video card, applies the generated transmission signals to respective data driving ICs, and generates and applies gate control signals to gate driving ICs in operation 710. Here, at least two of the transmission signals generated by the timing controller include load signal information indicating the application starting time points of different parallel data signals.

In operation 720, data driving ICs apply parallel data signals corresponding to data included in the transmission signals (referred to as reception signals) to a display panel. At this time, reception signals received by at least two of the data driving ICs include load signal information indicating different application starting time points. Thus, the at least two data driving ICs generate load signals that rise at different points in time, and supply the parallel data signals to respective data lines of the display panel at different points in time according to the load signals. In this way, it is possible to prevent a voltage level from being changed by a large current instantaneously flowing through the data lines.

In operation 730, gate driving ICs supply scan signals to respective gate lines of the display panel in sequence according to the gate control signals.

In operation 740, the display panel displays an image according to the scan signals applied in operation 730 and the parallel data signals applied in operation 720.

Figure 8:
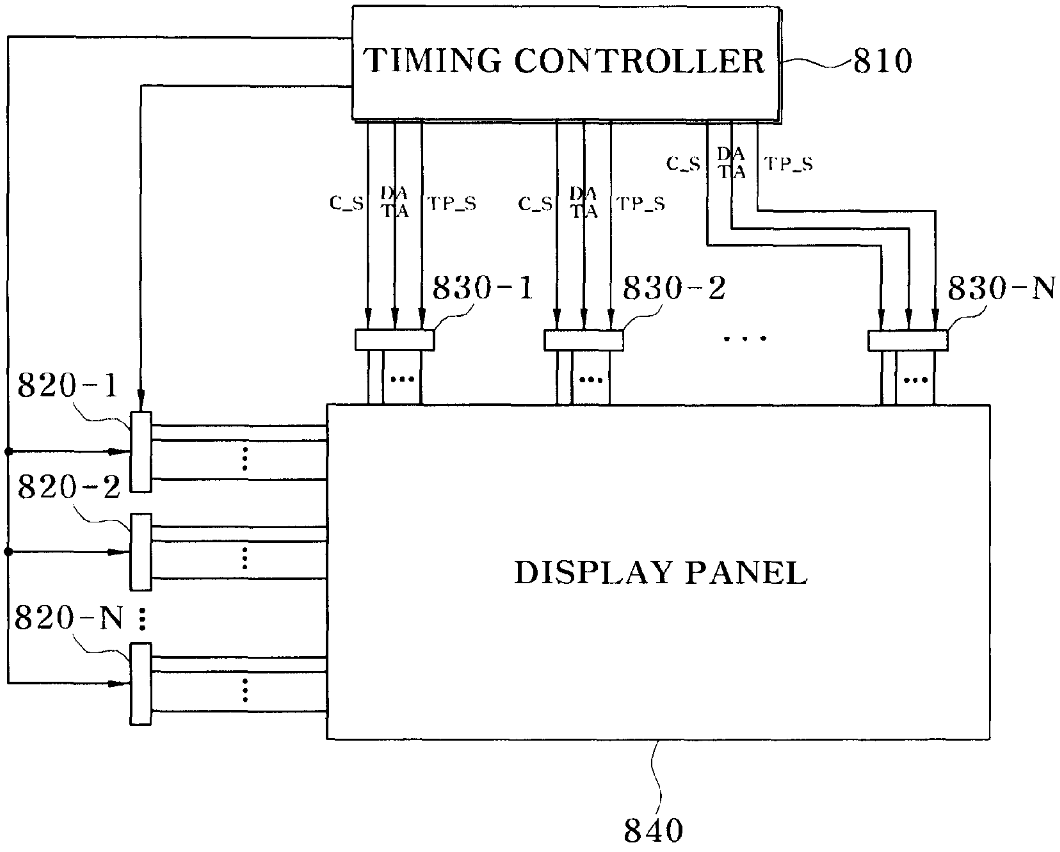
FIG. 8 is a block diagram of a display device according to another embodiment of the present disclosure.

FIG. 8 is a block diagram of a display device according to another embodiment of the present disclosure. Referring to FIG. 8, the display device includes a timing controller 810, a plurality of gate driving ICs 820-1, 820-2, . . . , 820-N, a plurality of data driving ICs 830-1, 830-2, . . . , 830-N, and a display panel 840.

The timing controller 810 generates a plurality of load signals TP_S, clock signals C_S and data DATA using video data and a synchronization signal input from an external video card, and applies the load signals TP_S, the clock signals C_S and the data DATA to the respective data driving ICs 830-1 to 830-N. Here, at least two of the load signals TP_S generated by the timing controller 810 rise at different points in time. The timing controller 810 generates and applies gate control signals to the gate driving ICs 820-1 to 820-N.

The gate driving ICs 820-1 to 820-N supply scan signals to respective gate lines of the display panel 840 in sequence according to the gate control signals applied from the timing controller 810. Thus, the gate lines of the display panel 840 are activated in sequence, and TFTs connected with the respective gate lines are turned on, so that signals can pass through the TFTs. In other words, data signals supplied from the respective data driving ICs 830-1 to 830-N can be supplied to pixel electrodes via TFTs connected with activated gate lines.

The data driving ICs 830-1 to 830-N generate parallel data signals corresponding to the data DATA applied from the timing controller 810, and supply the generated parallel data signals to data lines of the display panel 840, respectively. Since the load signals TP_S rising at different points in time are applied to at least two data driving ICs 830-1 and 830-2 among the data driving ICs 830-1 to 830-N, the data driving ICs 830-1 and 830-2 supply parallel data signals to data lines of the display panel 840 at different points in time.

The display panel 840 receives the scan signals through the gate lines and the parallel data signals through the data lines, and displays an image according to the signals. For example, the display panel 840 is an LCD panel, PDP, or OLED panel.

Figure 9:
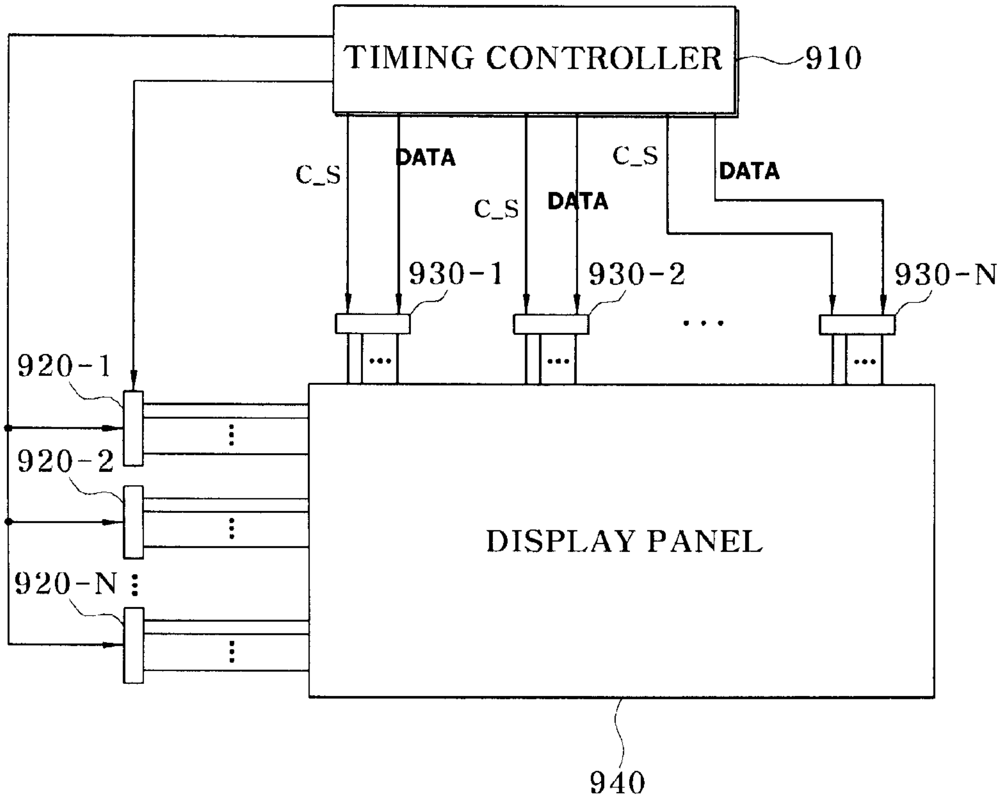
FIG. 9 is a block diagram of a display device according to still another embodiment of the present disclosure.

FIG. 9 is a block diagram of a display device according to still another embodiment of the present disclosure. Referring to FIG. 9, the display device includes a timing controller 910, a plurality of gate driving ICs 920-1, 920-2, . . . , 920-N, a plurality of data driving ICs 930-1, 930-2, . . . , 930-N, and a display panel 940.

The timing controller 910 generates clock signals C_S and data DATA using video data and a synchronization signal input from an external video card, and applies the clock signals C_S and the data DATA to the respective data driving ICs 930-1 to 930-N.

The gate driving ICs 920-1 to 920-N supply scan signals to respective gate lines of the display panel 940 in sequence according to gate control signals applied from the timing controller 910. Thus, the gate lines of the display panel 940 are activated in sequence, and TFTs connected with the respective gate lines are turned on, so that signals can pass through the TFTs. Data signals supplied from the respective data driving ICs 930-1 to 930-N can be supplied to pixel electrodes via TFTs connected with activated gate lines.

The data driving ICs 930-1 to 930-N generate parallel data signals corresponding to the data DATA applied from the timing controller 910, and supply the generated parallel data signals to data lines of the display panel 940, respectively. The respective data driving ICs 930-1 to 930-N store load signal information, generate load signals corresponding to the stored load signal information, and apply the parallel data signals to the display panel 940. At this time, at least two pieces of load signal information among the load signal information stored in the data driving ICs 930-1 to 930-N indicate different application starting time points. Thus, at least two of the data driving ICs 930-1 to 930-N apply parallel data signals to the display panel 940 at the different points in time.

The display panel 940 receives the scan signals through the gate lines and the parallel data signals through the data lines, and displays an image according to the signals. For example, the display panel 940 is an LCD panel, PDP, or OLED panel.

Figure 10:
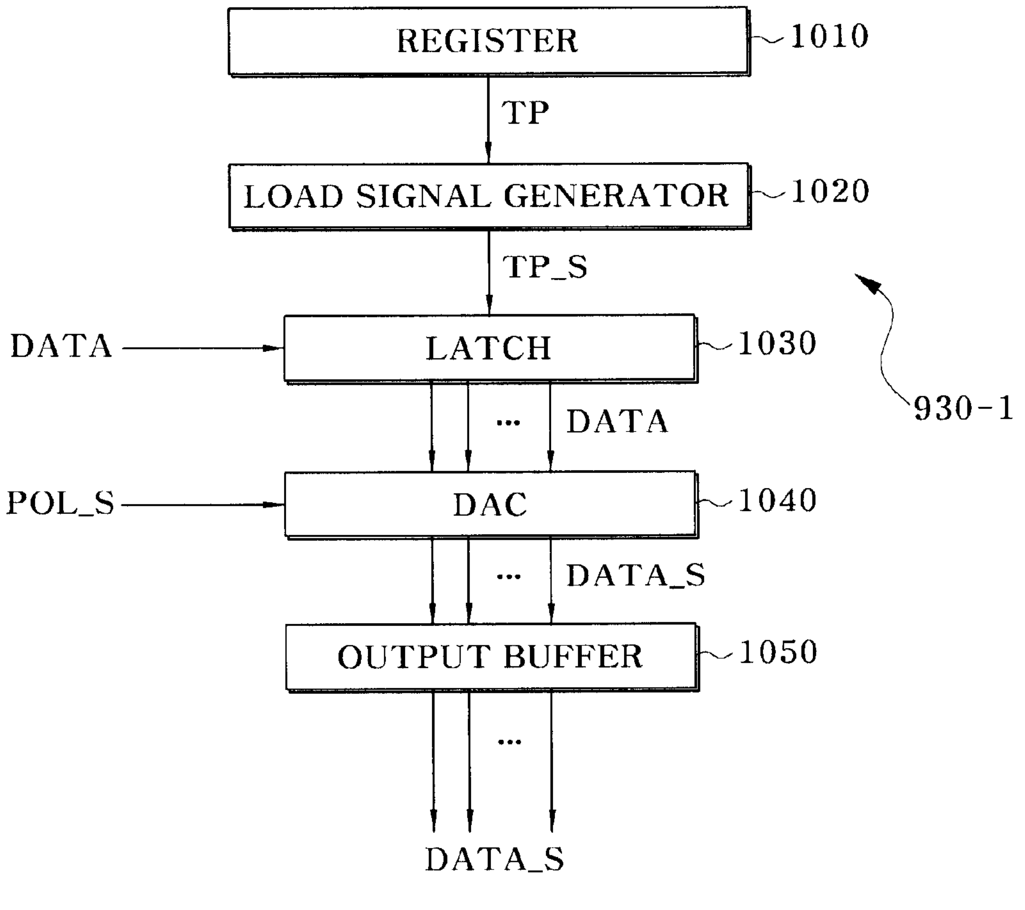
FIG. 10 is a block diagram of an example of a data driving IC shown in FIG. 9.

FIG. 10 is a block diagram of an example of the data driving IC 930-1 shown in FIG. 9. Referring to FIG. 10, the data driving IC 930-1 includes a register 1010, a load signal generator 1020, a latch 1030, a DAC 1040, and an output buffer 1050.

The register 1010 stores load signal information TP required to generate a load signal indicating the application starting time point of a parallel data signal.

The load signal generator 1020 reads the load signal information TP from the register 1010, generates a load signal TP_S corresponding to the load signal information TP, and applies the load signal TP_S to the latch 1030. The load signal generator 1020 generates the load signal TP_S from the load signal information TP in the same way as the load signal unit 530 shown in FIG. 6, and thus the process will not be described in detail again.

The latch 1030 latches data DATA applied from the timing controller 910 in sequence, and then outputs the data DATA to the DAC 1040 in parallel according to the load signal TP_S applied from the load signal generator 1020.

The DAC 1040 converts the parallel data DATA into a parallel data signal DATA_S corresponding to a gamma voltage, and transfers the parallel data signal DATA_S to the output buffer 1050. In particular, the DAC 1040 generates the parallel data signal DATA_S corresponding to the parallel data DATA with reference to one of a positive (+) gamma voltage and a negative (−) gamma voltage according to a polarity control signal POL_S applied from the timing controller 910. In this way, a data signal obtained by reflecting the positive (+) gamma voltage in a common voltage and a parallel data signal obtained by reflecting the negative (−) gamma voltage in the common voltage are alternately supplied to the display panel 940, and thus an inversion operation is enabled.

The output buffer 1050 provides the parallel data signal DATA_S transferred from the DAC 1040 to the corresponding data line of the display panel 940.

As described above, in a display device and method according to embodiments of the present disclosure, at least two of data driving ICs constituting the display device apply data signals to a display panel at different points in time, and thus it is possible to prevent a voltage level from being changed by a large current instantaneously flowing through a data line while the data signals are transferred.

Since the display device and method can transfer clock information, control information and data through one line, an electromagnetic interference (EMI) component caused by an additional clock line or control line is removed.

An embodiment of the present disclosure can be implemented as machine readable codes in a machine readable recording medium. The computer readable recording medium includes all types of recording media in which machine readable data are stored. Examples of the machine readable recording medium include a ROM, a RAM, a CD-ROM, a magnetic tape, a floppy disk, and an optical data storage. In addition, the machine readable recording medium may be distributed to several machines over a network, in which machine readable codes may be stored and executed in a distributed manner. A functional program, code, and code segments for implementing an embodiment of the present disclosure can be readily deduced by programmers in the technical field of the present disclosure.

The foregoing is illustrative of the present disclosure and is not to be construed as limiting thereof. Although numerous embodiments of the present disclosure have been described, those skilled in the art will readily appreciate that many modifications are possible in the embodiments without materially departing from the novel teachings and advantages of the present disclosure. Accordingly, all such modifications are intended to be included within the scope of the present disclosure as defined in the claims. Therefore, it is to be understood that the foregoing is illustrative of the present disclosure and is not to be construed as limited to the specific embodiments disclosed, and that modifications to the disclosed embodiments, as well as other embodiments, are intended to be included within the scope of the appended claims. The present disclosure is defined by the following claims, with equivalents of the claims to be included therein.

What is claimed is:

1. A display device, comprising:

a timing controller configured to transmit a plurality of reception signals;

a plurality of data driving integrated circuits (ICs) configured to receive the reception signals, each of which includes data and load signal information, the load signal information indicates application starting time points of the data, and apply parallel data signals corresponding to the data at the application starting time points according to the load signal information included in the reception signals; and a display panel configured to display an image according to the parallel data signals, wherein at least two of the data driving ICs apply the parallel data signals at different application starting time points, wherein the application starting time points of the data are determined by the timing controller, wherein a clock signal is embedded in the data and the load signal information, and wherein the clock signal, the data and the load signal are transmitted via a same signal.

2. The display device according to claim 1, wherein the timing controller is configured to transfer the reception signals to the data driving ICs.

3. The display device according to claim 2, wherein the load signal information is multiplexed together with the data and transferred from the timing controller to the respective data driving ICs through a transmission signal line, through which the data is transferred from the timing controller to the respective data driving ICs.

4. The display device according to claim 3, wherein the timing controller generates a clock information, and the clock information is multiplexed together with the data and the load signal information and transferred to the respective data driving ICs through the transmission signal line.

5. The display device according to claim 4, wherein each of the data driving ICs includes:

a clock generator configured to generate a clock signal from the clock information included in the reception signal received through the transmission signal line;

a signal controller configured to generate a load signal corresponding to the load signal information included in the reception signal; and a data driver configured to generate a data signal corresponding to the data included in the reception signal.

6. The display device according to claim 1, wherein gamma voltages having different polarities are reflected in at least two of the parallel data signals.

7. The display device according to claim 6, wherein the timing controller is configured to generate a plurality of pieces of polarity control information informing the data driving ICs of the polarities of the gamma voltages and apply the generated pieces of polarity control information to the data driving ICs.

8. The display device according to claim 1, wherein the at least two of the data driving ICs generate load signals having different pulse widths.

9. The display device according to claim 1, wherein the at least two of the data driving ICs receive the reception signals indicating the application starting time points simultaneously.

10. The display device according to claim 1, wherein the load signal information received by the at least two data driving ICs indicates the application starting time points.

* * * * *